United States Patent
Cho (10) Patent No.: US 6,988,896 B2
(45) Date of Patent: Jan. 24, 2006

(54) MONITOR TOP TYPED SIMULATION SYSTEM AND METHOD FOR STUDYING BASED ON INTERNET

(76) Inventor: In-Hyung Cho, 3F, 906 Eunhaeng-dong, Jungweon-gu, Sungnam 462-831 (KR)

( * ) Notice: Subject to any disclaimer, the term of this patent is extended or adjusted under 35 U.S.C. 154(b) by 0 days.

(21) Appl. No.: 10/678,300

(22) Filed: Oct. 3, 2003

(65) Prior Publication Data

US 2004/0115609 A1 Jun. 17, 2004

Related U.S. Application Data

(63) Continuation of application No. PCT/KR02/00664, filed on Apr. 11, 2002.

(30) Foreign Application Priority Data

Apr. 12, 2001 (KR) .......................................... 2001/19439
Jul. 5, 2001 (KR) .......................................... 2001/40086

(51) Int. Cl.
*G09B 25/00* (2006.01)

(52) U.S. Cl. .................... 434/365; 446/82; 446/236; 446/268; 434/308; 434/307 R (58) Field of Classification Search ................ 434/118, 434/322, 350, 169, 307 R, 308; 446/82, 236, 446/268, 301
See application file for complete search history.

(56) References Cited

U.S. PATENT DOCUMENTS 4,356,658 A * 11/1982 Goldfarb ..................... 446/83
5,465,909 A * 11/1995 Roth .......................... 232/1 D
5,636,994 A * 6/1997 Tong ........................... 434/308
5,752,880 A * 5/1998 Gabai et al. .................... 463/1
5,977,951 A * 11/1999 Danieli et al. ............... 345/156
6,149,441 A    11/2000 Pellegrino et al. ........... 434/350
6,160,540 A * 12/2000 Fishkin et al. ............... 345/184
6,160,986 A * 12/2000 Gabai et al. ................. 434/308
6,192,215 B1 * 2/2001 Wang ..................... 434/307 R
6,227,931 B1 * 5/2001 Shackelford ................. 446/268
6,319,010 B1 * 11/2001 Kikinis ........................ 434/169

FOREIGN PATENT DOCUMENTS

| JP | 2000-315043 | 11/2000 |
|---|---|---|
| KR | 2000-54661 | 9/2000 |
| KR | 2000-54844 | 9/2000 |

* cited by examiner

*Primary Examiner*—Xuan M. Thai
*Assistant Examiner*—Cameron Saadat
(74) *Attorney, Agent, or Firm*—St. Onge Steward Johnston & Reens LLC (57) ABSTRACT

Disclosed is a computer interactive learning system and method, the method being applied to the Internet simulation learning system comprising a learner client to which at least one computer-controllable learner aid device is electrically connected and at which a learning agent is installed, and a learning server connected with the learner client through Internet, the method comprising the steps of: operating the learning agent; downloading a learning information and a character information corresponding to the learner aid device from the learning server; registering the respective learner aid devices as specific characters based on the character information downloaded; responding to a content provided from the learning agent based on the learning information at the learner; determining the response of the learner; and operating the learner aid device to perform a corresponding action depending on the determining result.

2 Claims, 7 Drawing Sheets

MONITOR TOP TYPED SIMULATION SYSTEM AND METHOD FOR STUDYING BASED ON INTERNET

This application is a continuation of PCT/X202/00664 filed Apr. 11, 2002.

TECHNICAL FIELD

The present invention relates to a computer interactive learning method, and more particularly, to a computer interactive learning system and method of operating the same in combination with a simulation apparatus or learner aid device connected with a computer and thus enhancing learning effect.

BACKGROUND ART

Under a circumstance in which most information is provided in real-time due to the development of Internet technologies, learning of various fields or subjects is being carried out through Internet. This trend is gradually being applied to children who are poor at the manipulation of the computer.

However, children do not have a high curiosity on a general computing environment where all information is provided through display monitor, and accordingly learning is not sustained or learning efficiency is lowered.

DISCLOSURE OF INVENTION

Accordingly, the present invention has been made to solve the foregoing problems and it is an object of the present invention to enhance the curiosity for children in learning with the computer as a learning medium.

It is another object of the invention to provide learning information through means other than display monitor and to thus attract an interest toward learning, thereby enhancing learning efficiency.

It is further object of the invention to obtain a maximal learning effect at a minimal cost.

Additional features and advantages of the invention will be set forth in the description which follows, and in part will be apparent from the description, or may be learned by practice of the invention.

To accomplish the above object, according to one aspect of the invention, there is provided a computer interactive learning method applied to a computer interactive learning system comprising a learner client to which at least one computer-controllable learner aid device is electrically connected and at which a learning agent is installed, and a learning server connected with the learner client through Internet, the method comprising the steps of: operating the learning agent; downloading a learning information and a character information corresponding to the learner aid device from the learning server; registering the respective learner aid devices as specific characters based on the character information downloaded; responding to a content provided from the learning agent based on the learning information at the learner; determining the response of the learner; and operating the learner aid device to perform a corresponding action depending on the determining result.

The action performed by the learner aid device comprises a gesture depending on a decided content, a voice output and facial expression acting.

The learner provides the response for the content provided from the learning agent through voice or touch screen, and the learning agent determines the response of the learner based on information inputted from an assistant of the learner.

The learner aid device is provided with a microcomputer and a memory storing operation information to which a control code is added. As one example, the learner aid device comprises a character toy having a facial display part on which moving picture multimedia is provided.

As one embodiment, the learner aid device comprises: a housing a receiving space formed therein and an entrance formed at the front thereof; a slide board recessed into or protruded from the housing; and a rotatable supporting stage rotatably installed on the slide board, for supporting an interactive or character toy.

As another embodiment, the learner aid device comprises: a housing a receiving space formed therein and an entrance formed at the front thereof; a rotatable supporting stage rotatably installed on the slide board, for supporting a character toy; and a door for opening and closing the entrance.

As another example, the learner aid device comprises a housing formed integrally with a case of a CRT or LCD at both sides or rear face of the CRT or LCD, and a supporting arm enabling a character toy to come in and out through the housing.

The character toy has a head portion comprising a head case and a display part installed at the front of the head case, for showing various face expression. By rotating the head case, it is possible to change the head shape and to thus make various facial expressions.

Also, the learning agent is installed in advance at the learner client or is installed by real-time downloading the same while accessing to the learning server.

According to the present invention, the Internet simulation learning method further comprises the steps of: providing any one of the learner aid devices with a learning content from the learning agent; responding to with a decided content regardless of the provided learning content at one of the learner aid devices; and performing actions corresponding to the decided content at the remainder of the learner aid devices.

According to another aspect of the invention, there is provided a simulation learning method applied to a learner client to which at least one computer-controllable learner aid device is electrically connected, the method comprising the steps of: providing a storage medium storing a character information applied to a learning agent, a learning information and the learner aid device; operating the learning agent from the storage medium; registering the respective learner aid devices as specific characters based on the character information; responding to a content provided from the learning agent based on the learning information at the learner; determining the response of the learner; and operating the learner aid device to perform a corresponding action depending on the determining result.

BRIEF DESCRIPTION OF THE DRAWINGS

The above objects and other advantages of the present invention will become more apparent by describing in detail preferred embodiments thereof with reference to the attached drawings in which.

BEST MODE FOR CARRYING OUT THE INVENTION

Hereinafter detailed description will be made about a preferred embodiment of the invention with reference to the accompanying drawings.

Figure 1:
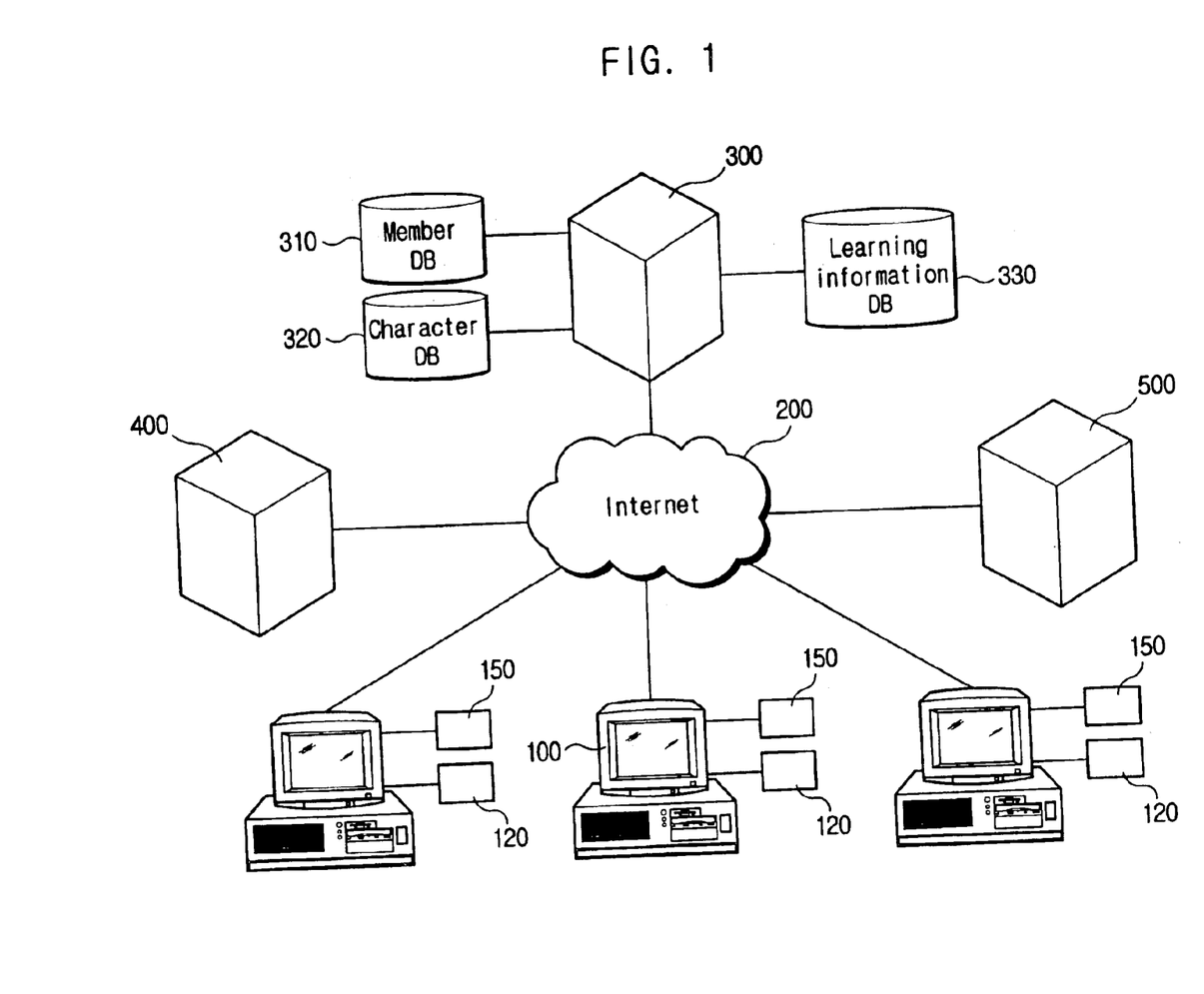
FIG. 1 is a schematic view of a computer-interactive learning system in accordance with the present invention.

FIG. 1 is a schematic view of a computer-interactive learning system in accordance with the present invention.

As shown in FIG. 1, respective learner clients 100 are electrically connected with a computer-controllable learner aid device 150. The learner aid device 150 includes a character toy or a game apparatus, which is provided with a microcomputer and selectively has a display device. The learner aid device is, for instance, connected with the client 100 through the USB (Universal Serial Bus) port. Also, in case of using the USB hub, it is allowed to connect a plurality of learner aid device to a single client 100.

For reference, the inventor discloses a supporting device for a simulation apparatus having both the USB hub function and the switching function in Korean Patent Application No. 2001-15110.

A learning agent 120 operate in the learner client 100, and it can be in advance downloaded from a learning server 300 and installed, or it can be installed in the form of the ASP (Active Server Page) or JavaScript from the learning server 300 if necessary.

The learner client 100 is connected with the learning server 300 through Internet 200. The learning server 300 possesses various learning information and contents. For instance, the learning information is stored in a learning information DB 330. The learning server 300 enables the learner client 100 to register as a member charged or free, and it can store the learner client information in a member DB 310 and manage them. Also, the learning server 300 stores and manages information about characters that the learner client uses in a character DB 320.

Alternatively, the learning server 300 can obtain learning information and contents by a contents processing server 400, and it can sell the learning information, learning agent, and character information stored in a storage medium like a CD (Compact Disk) to the learner client through a delivery agent 500. Specific process of the learning server 300 corresponds to a basic content of electronic commerce and thus detailed description thereof is omitted.

Figure 2:
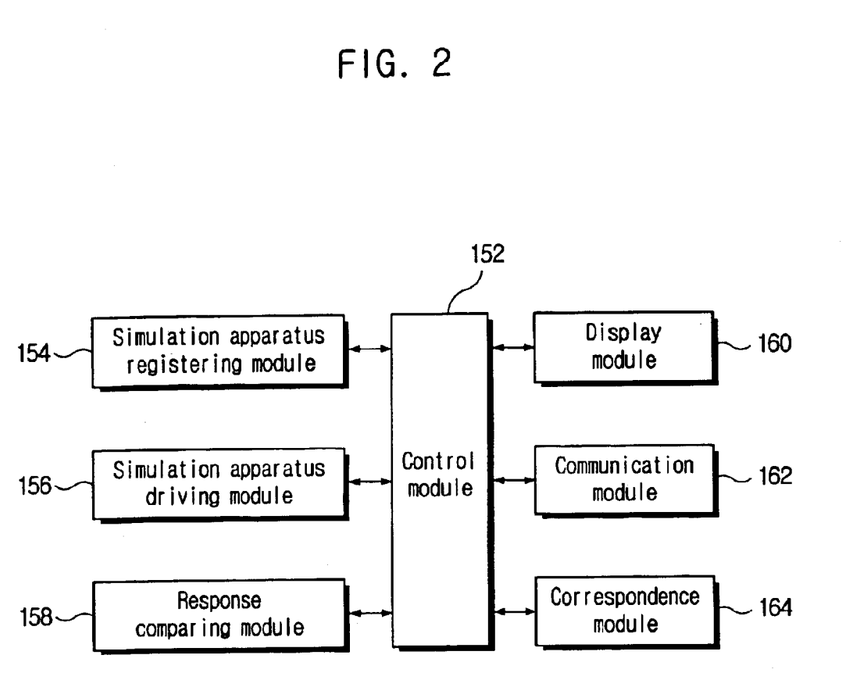
FIG. 2 is a block diagram of a learning agent in accordance with the present invention.

Referring to FIG. 2, a block structure of the learning agent 120 given to the learner client 100 is shown.

A learner aid device registering module 154 allows learners or assistants to register corresponding to a character selecting the learner aid device connected to the corresponding client. For instance, when it is assumed that the learner or assistant selects three characters from the learning server 300 and the number of the learner aid devices connected to the corresponding client is four, the three selected characters are properly allotted to three learner aid devices out of the four learner aid devices. At this time, in case the respective learner aid devices have the facial display part, a corresponding number of graphic cards are equipped in the clients and thus separate moving pictures can be provided.

A learner aid device driving module 156 receives commands from a control module 152 and drives the learner aid device to perform a decided action and make a facial expression. For instance, in case the response of the learner is correct, the learner aid device driving module 156 allows the learner aid device to perform an action, such as making a comical face expression, clapping one's hands or outputting a constant voice, or touching the display by itself, or explaining an object while indicating the object.

A response comparing module 158 determines whether or not a response of the learner is placed within a correct answer range depending on the degree of difficulty set by an assistant. This module can be enabled or disabled according to the setting of the assistant. In case the module is disabled, the assistant directly inputs determination results.

A correspondence module 164 decides whether the learner aid device performs which facial expression or action. In other words, like the above, in case it is determined that the response of the learner is included within the correct answer range, the correspondence module 164 decides the action which the learner aid device performs, for instance, making comical facial expression, clapping one's hands, touching the display, or indicating an object which is displayed on the screen, or outputting a constant voice, and notifies the control module 152 of the decided action. Also, selectively it is possible that the assistant checks the response of the learner instead of the correspondence module 164 and inputs the action to be performed through a separate input device, which is described later.

A display module 160 displays various learning information and related information on the monitor of the client, preferably in the format of HTML.

Also, a communication module 162 can transmit or receive data with the learning server 300 in a prescribed format through the Internet 200.

Hereinafter, there is described in detail a learning method in accordance with the present invention with reference to FIGS. 3 and 4. For the convenience of the description, there is illustrated, for example, a case in which three or four aged children learn English with a parent as the assistant.

Figure 3:
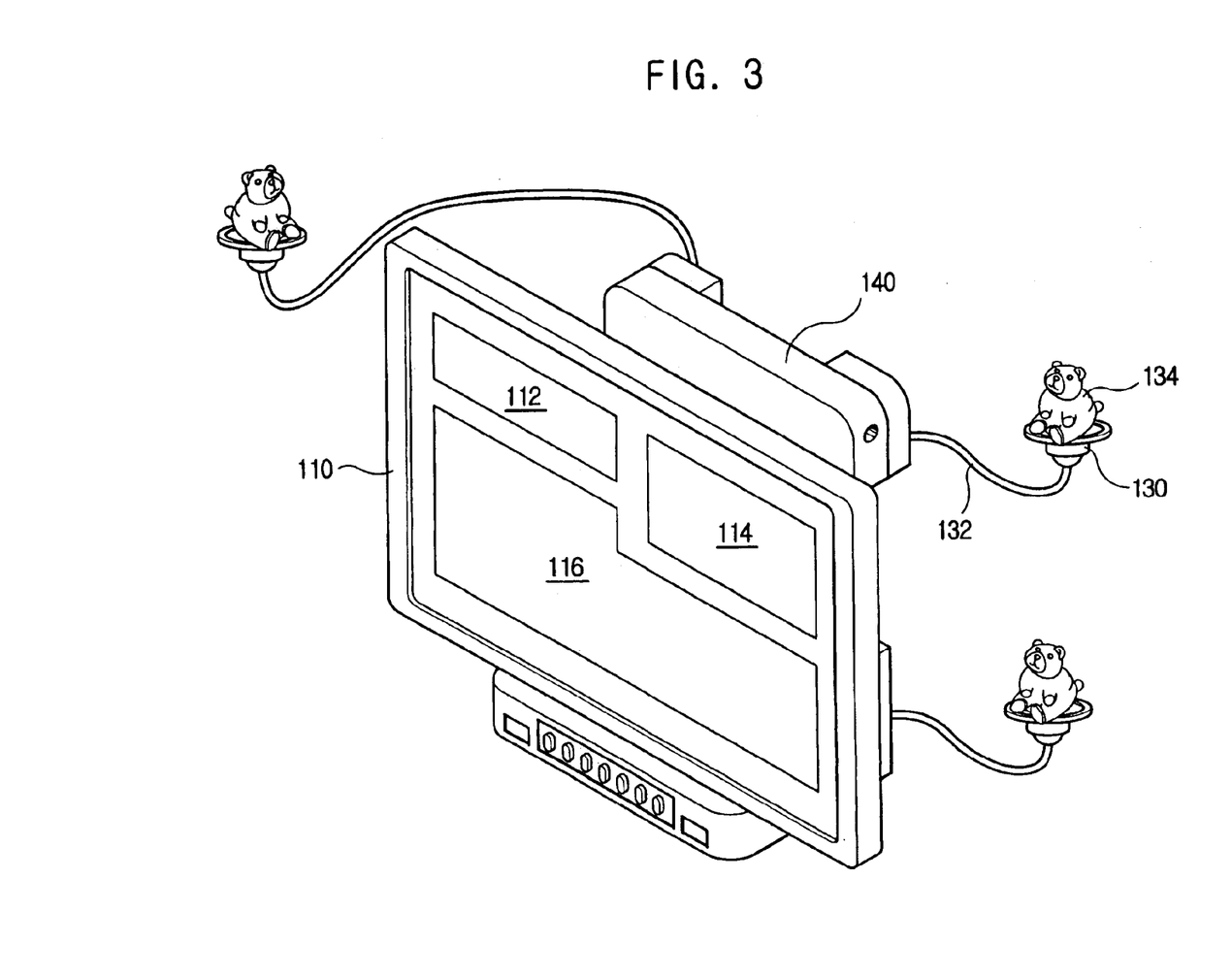
FIG. 3 is a perspective view of a learner aid device in accordance with the present invention.

In a monitor top simulation learning system in accordance with the present invention as shown in FIG. 3, a learner client 100 includes a computer system connected to the Internet, a distribution device 140 having the hub function and the switching function, to which a supporting device for supporting the learner aid device is fixed, and a display device 110 fixed to the distribution device, for displaying information.

Further, a plurality of flexible tubes 132 are extracted from the distribution device 140, and a supporter 130 is installed at one end of each of the flexible tubes 132. As disclosed in the aforementioned Korean Patent Application No. 2001-15110, a control line for operating the learner aid device, i.e., a toy 134, is equipped inside the flexible tube 132.

The toy 134 is provided with a microcomputer and a memory therein. Also, the toy 134 selectively has a face display part for selectively displaying a facial expression, which is described later. The memory of the toy 134 stores action information to be performed according to a command of the control module 152 of the learning agent 120. Accordingly, according to a control code received through the learner aid device driving module 156 from the control module 152, the microcomputer of the toy 134 reads out the corresponding action information from the memory to thus operate the toy.

A display monitor 110 is divided into for example, three areas: learner display area 112, teacher display area 114 and learning information display area 116.

Figure 4:
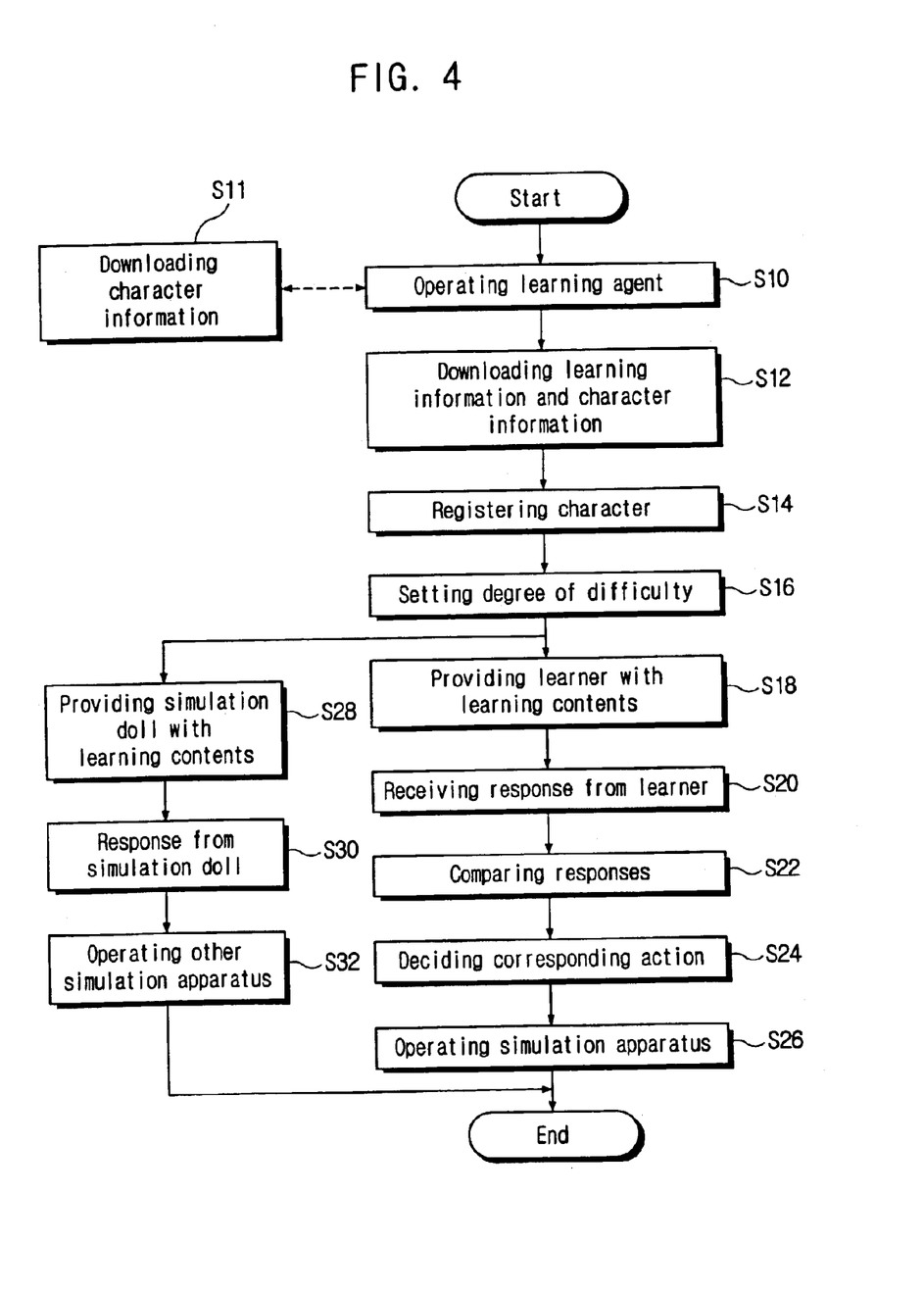
FIG. 4 is a flow chart for illustrating a learning method in accordance with the present invention.

Referring to FIG. 4, there is described a learning method in accordance with the present invention.

A learner who has registered in the learning server 300 as one of members, operates the learning agent 120 and accesses to the learning server 300 through the communication module 162 with the Internet 200 as a medium, (S10) or after first accessing to the learning server 300 using the Internet 200, the learner downloads the learning agent 120 in the form of ASP or JavaScript in real time and can install the learning agent 120. (S11) At this time, the real learner is a child; these steps are performed by an assistant, for example, parents.

Thereafter, the assistant selects at least one character and learning information, which the learner learns, and then downloads the selected character and learning information. (S12) It is more effective in the learning to select the character as an object intimately felt by the learner.

The assistant registers the downloaded character to correspond to the character toy connected to the learner's computer system. (S14) Accordingly, the learning agent 120 operates character toys corresponding to roles allocated to the respective characters while operating a learning program based on the downloaded learning information.

Afterwards, the assistant sets the degree of difficulty of subjects to be performed out of the downloaded learning information. (S16) The learning agent 120 extracts a corresponding learning content out of the downloaded learning information according to the difficulties as set.

Thus, after the basic setting has been completed, the learning programs starts. The learning agent 120 operates the learning in two types and first one is described in the below.

First, a learning content is provided directly to the learner. (S18)

In other words, the learning agent 120 displays the teacher information on the teacher display area 114 of the display monitor 110, the learner's name or face on the learner display area 112, and drawings or description corresponding to questions on the learning information display area 116. Also, if necessary, it is allowed to display a proceeding order so that the assistant smoothly manages the proceedings of the learning for the learner with reference to the same.

As one example using the display area, the learning agent 120 displays a picture of an apple or a person eating an apple together with a voice asking through character toy such as "What is the English translation of a Korean word "Sagwa"?". Also, multiple choices of answers are displayed on the learning information display area 116 such that the learner can select one among them.

The learner answers the question either in voice or by touching one out of the selectable answers displayed on the learning information display area 116. (S20) At this time, the learner may include other character toy identically participating in the study.

The response comparing module 158 of the learning agent 120 compares the learner's answer with the standard correct answer, (S22) and the correspondence module 164 decides corresponding actions of the learner aid devices based on comparison result of the response comparing module 158.

(S24) At this time, in case the response comparing module 158 receives the learner's answer in voice, it compares the received learner's voice with the standard voice. In case of children, since it is difficult that the input voice has a precise pronunciation, an allowable range is set, so that similar voice input included within the allowable range can be regarded as a correct answer.

To the corresponding actions, as aforementioned, control codes are allocated depending on types and are stored in the memory of the character toy. For example, in case the learner's answer is a correct answer, the response comparing module 158 allows the character toy to clap its hands together with various facial expressions or to output a voice, such as "congratulate", "it's a correct answer". In case the learner's answer is an incorrect answer, the response comparing module 158 allows the character toy to jeer or to output a voice, such as "being also incorrect answer", "study more hard" or the like.

Thus, if one corresponding action is decided, the learner aid device driving module 156 outputs a control code corresponding to the corresponding action to the microcomputer of the character toy to operate the character toy to perform the corresponding action. (S26) Thus, by operating the character toy according to the learner's response, the learner who is a child can have a learning motivation, so that there is provided an advantage in that the learning efficiency is enhanced. Further, if the character toy reflects the learner's desired character image, more effect can be obtained.

Alternatively, after the learner responds to the question, the assistant can determine or judge the response of the learner and directly inputs a code corresponding thereto, thereby enabling the subsequent operation of the learner aid device. In other words, if not the learning agent 120 but the assistant compares and determines the learner's response and inputs a control code corresponding thereto to the learning agent through a separate input device that is not perceived by the learner, it is allowed that the character toy performs an action corresponding to the control code, so that it is possible to simplify the process.

Hereinafter, there is described a different type operated by the learning agent 120 so as to indirectly enhance the learning efficiency of the learner.

The learning agent 120 provides one of the character toys with a learning content according to a prescribed order. (S28)

For example, the learning agent 120 asks a character toy registered as "Pikachu" a voice question "What is the English translation of a Korean word "Sagwa"?"At this time, the learner awaits the learner's favorable character "Pikachu" how to answer the question, and indirectly compares the answer of the Pikachu with the learner's ability.

Afterwards, the character toy responds according to a prescribed way along with a facial expression. (S30) In other words, the character toy operates or responds not arbitrarily but according to a prescribed program so as to enhance the learner's learning efficiency. In other words, in case the learner does not respond to a question that was given to the learner, it is shown that the learner's favorable character does not indicate a correct answer on the display, speaks an incorrect answer, or does not answer the question, or answers in opposite to the question, thereby capable of enhancing the learner's learning motivation.

Also, as aforementioned, in response to the answer of the character toy, other character toys operate. (S32)

Figure 5:
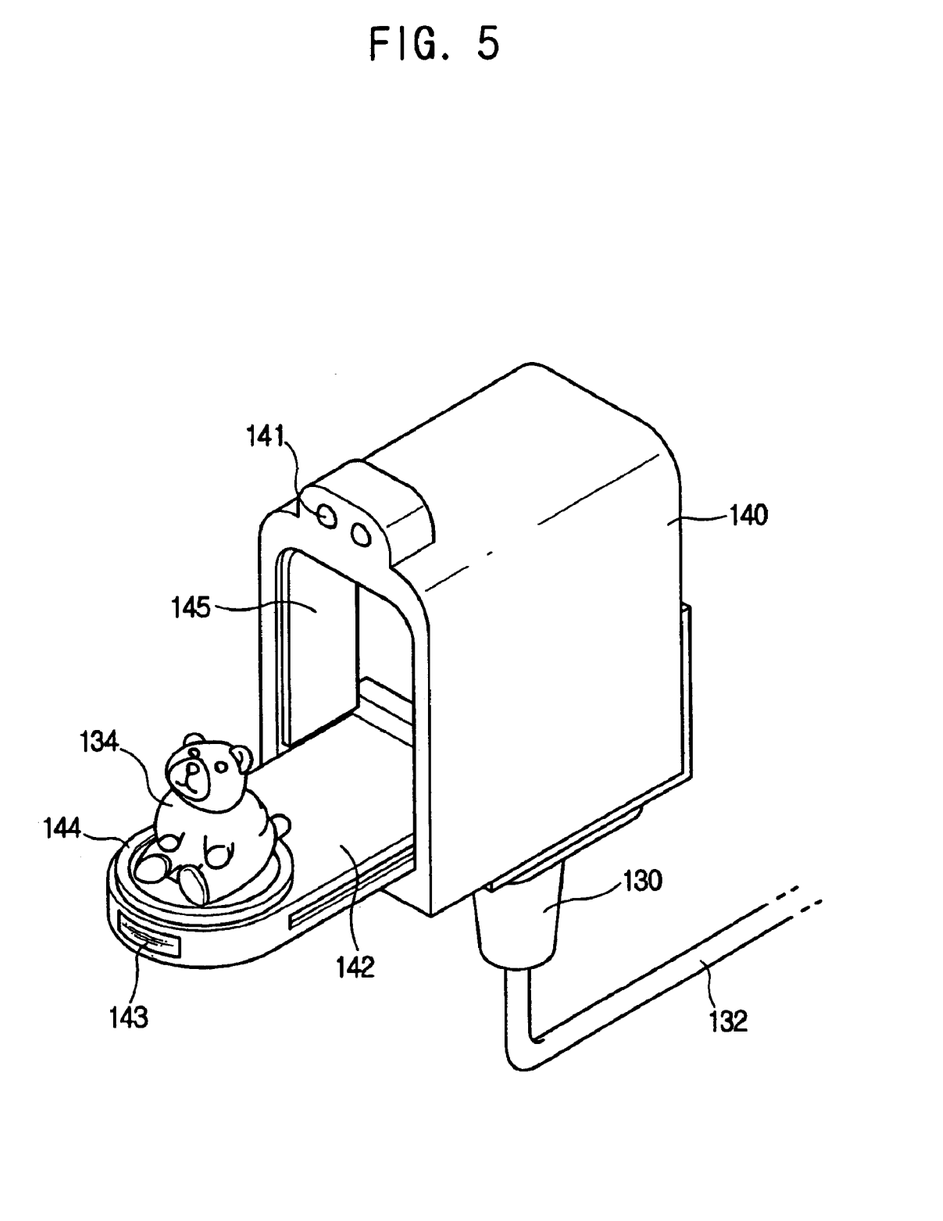
FIGS. 5 and 6 are perspective views showing a portion of a learner aid device in accordance with another embodiment of the present invention.
Figure 6A:
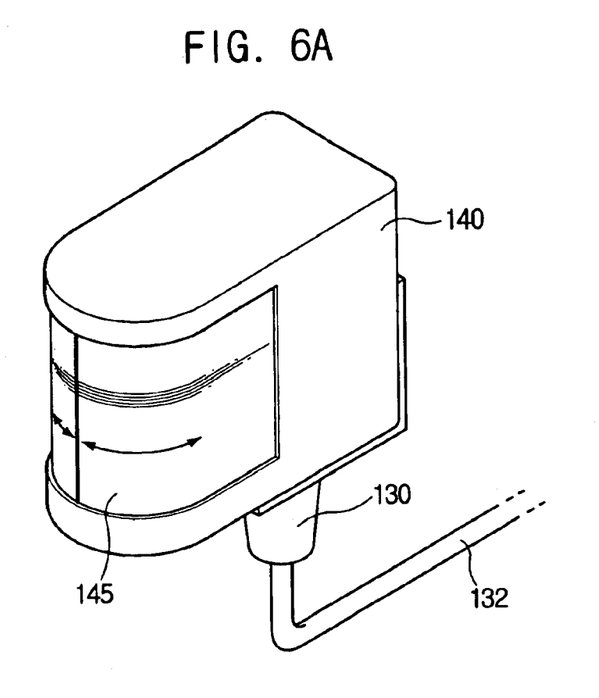
Figure 6B:
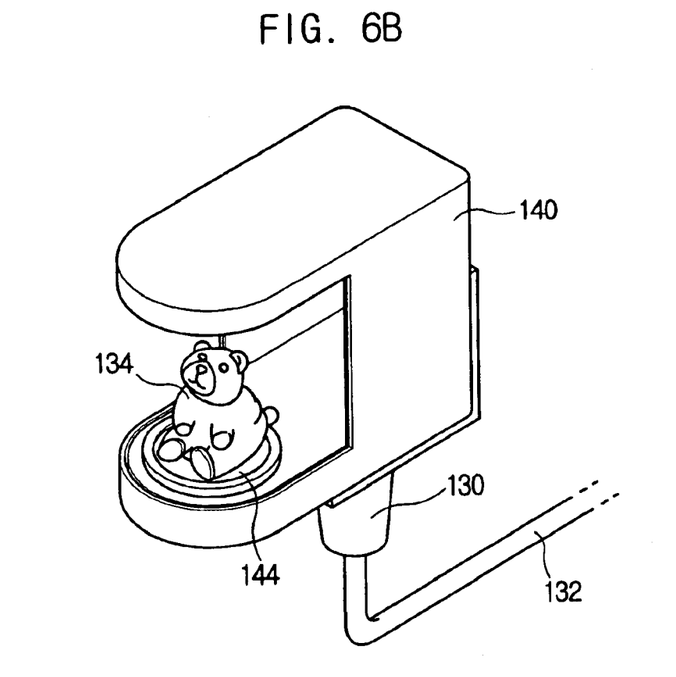
Figure 7:
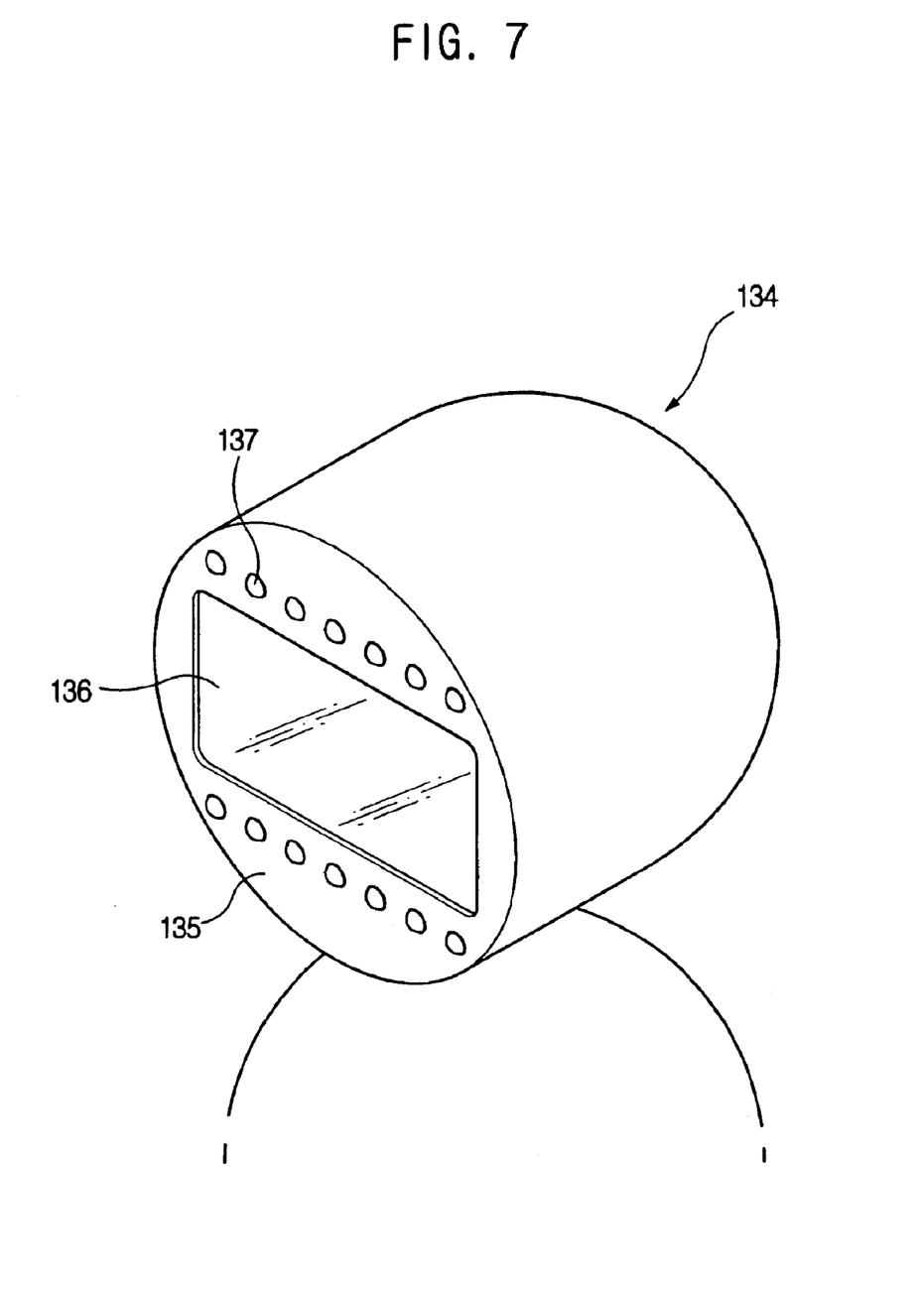
FIG. 7 is a perspective view showing one example of the face of a character toy in accordance with the present invention.

Referring to FIGS. 5 to 7, there are shown other embodiments of the learner aid devices applied to the present invention.

Referring to FIG. 5, a learner aid device includes a housing 140 having a receiving space formed therein and an entrance 145 formed at the front thereof, a slide board 142 recessed into or protruded from the housing 140, and a rotatable supporting stage 144 rotatably installed on the slide board 142, for supporting a character toy 134.

Preferably, a status display lamp 141 for displaying a current status of the character toy 134 is installed at the front upper portion of the housing 140, and an infrared sensor 143, a voice recognition sensor or a LAN module capable of remote-controlling the slide board 142 is installed at the front of the slide board 142.

The above constituted learner aid device is fixed on a supporter 130 and is connected with a flexible cable 132 or other fixing unit.

The shape of the housing 140 can be variously changed. For instance, as shown in FIG. 6, the slide board is removed, and an opaque or semitransparent door 145 is installed such that the character toy 134 is sighted or disappears.

Also, although not shown in the drawings, it is allowed that the learner aid device is installed so as to be able to come in and out the receiving case integrally formed with the case of CRT, LCD or the like, and that a supporting arm, which fixes the learner aid device appears at the front of the apparatus by operation thereof, thereby enabling the same action.

By constituting the learner aid device like the above description, it is possible for the learner to escape from a simple conversation type learning method and to have a feeling of learning together with the character toy. Also, by grasping the character toy as one existence, the learner aid device results in further enhancement in the learning efficiency.

For example, after ending a constant time of learning according to a prescribed program, in case the learner rests a while or parts (ends) from the character toy, it is possible to set the operation of the character toy to be matched with such a circumstance. In other words, if a rest time or parting time starts, the character toy 134 makes a remark to the learner, for instance, "take a rest", "go into, take a rest and come"or "let's separate today" or the like, and the slide board 142 slides inside the housing 140 in a state where the rotatable supporting stage 144 rotates and is directed toward the housing 140. Simultaneously with the slide board 142 entering into the housing 140, the character toy 134 again appears and takes an action disappearing with waving its hand together with comments such as "I will rest here"or "so much for today! Bye now" or the like while sitting on a chair or bed on the display. Also, even in case again starting, displaying is first performed on the screen, the character toy 134 appears in the reverse order, or appears in an alarm function, remote control function, LAN function, voice recognition function or the like, or a proper acting can be performed.

Accordingly, the learner acknowledges this object called the character toy as one existence, lives and grows up together with the character toy from the rising hour to the sleeping hour, so that the learner assimilate educationally, and in habituation in particular in terms of language.

In the meanwhile, referring to FIG. 7, by changing the shape of the character toy 134, it is possible to more realistically express the actions of the toy.

In other words, as shown in FIG. 7, a facial display part 136 is formed at the front of a head case 135 in the form of LCD, EL, LED, etc., thereby capable of producing various facial expressions and motions. Also, a voice level display lamp 137 is installed at an upper portion and a lower portion of the facial display part 136 in the form of line and thus the display lamp 137 emits light, thereby inducing the learner's curiosity.

Also, although not shown in the drawings, by forming the facial display part 136 at the front and rear faces of the head case 135 and making the head case be rotatable, it is allowed that different facial expressions are shown according to a given circumstance. As another example, the character toy is made to be exposed with respect to the housing, and is made such that the front shape is different than the rear shape, to be rotatable by 180 so that the character toy can be used like as two toys. In other words, if changing shape, clothes, skin or the like by half and constructing the front side and the rear side of the hair style of the head case to be different from each other, more various variation can be provided according to various facial expression acting of the facial display part. In other words, by changing the shape and voice of the character toy at the same position, the character toy is changed in an instant into completely different one, thereby providing the learner with realistic learning effect.

In the above, cases of English learning using the character toy according to the preferred embodiment have been exemplarily described. These learning methods can be used in various fields, for example, oral narration of fairly tale, quiz game, Paduk, science experiment, sport, a variety of public relations and guidance, acting of advertisement, or the like. Especially, since the simple-operated robot is high price and does not operate in combination with the display device, it does not provide various visual effects. However, since the character toy according to the present invention can be provided at a low price and operate in combination with the display device, it is suitable for the learning effect.

Also, the character toy can be recognized as one existence as well as a role as the co-learner and thus it is permitted that the character toy makes a role as a personal secretary or friend. Further, the character toy can be programmed to make an influence on the growth of the learner, e.g., child such that the operation of the character toy is varied with the growth of the learner.

Furthermore, the learner aid device is not limited to toys but can be applied to objects, such as game machine, animal toys or the like. In other words, any object including the microcomputer for the operation control and the memory is possible regardless its shape.

Moreover, as examples of extending the aspect of the learning, there are getting on a train, going by airplane, riding in a merry-go-round, space play, etc., generally carried out in an amusement park. Among such examples, one is that a rail is installed using the learner aid device and the learner aid device operates in combination with contents displayed on the monitor. In other words, in a state where the rail is installed near the monitor and a train travels on the rail, when it is assumed that the character toy displayed on the monitor gets on the train, the character toy disappears from the monitor, the character toy gets on the train and travels round the rail near the monitor as soon as the train operates, and again appears on the display, thereby allowing the learner not to discriminate an imaginary space from the real space and properly applying these phenomena to the learning to further enhancing the learning effect.

Also, as aforementioned, it is possible to provide the learner with the character information applied to the learning agent; the learning information and the learner aid device through a storage medium on off-line.

Further, the learner aid device for guidance and public relations can replace human being in an airport, a fair and sports games where many peoples come in and out. In these places, it is possible to let a character preferred by foreigners, e.g., an intimate character resembling a person well-known in that country or wearing the national costume of that country, appear learning system and to allow the character to speak the national language of that country and to show a comical action, thereby utilizing the character for the guidance and public relations.

Furthermore, by allowing the learner aid device to show various actions and facial expressions, and to enter the inside and the outside of the display naturally at a general shop or department store, it is possible to advertise their goods or attract the customers' eyes.

INDUSTRIAL APPLICABILITY

As described previously, the present invention has the following advantages.

First, in the children's learning with a computer as a medium, curiosity on the learning is amplified and thus learning motivation increases. In other words, questioning and answering are not performed on one space of the display monitor like the conventional learning program but three-dimensional object called learner aid device is used as the auxiliary learning tool, thereby further increasing the curiosity. In addition, the learner's favorite character is included, so that the learning motivation is much more enhanced and thus the learning efficiency is also enhanced.

Further, since it is possible to download and use various learning information and characters, maximum learning effect can be obtained at a low price. In other words, if a learner feels a repugnance to one character, the character can be changed for the progress of the learning without paying an additional cost.

Furthermore, the child who is a learner feels the character toy not as a simple learning assistant but as one co-learner, so that the learning will be much more enhanced.

Moreover, the learner aid device can be changed in a variety of shapes, thereby allowing the learner to escape from a simple conversation learning method and feel a co-learning effect together with the character toy. Also, the learner aid device allows the learner to grasp the character toy as one existence, thereby resulting in the learning efficiency being much more enhanced.

Also, since the display operates in combination with the character toy, it is possible to replace the guider with the learner aid device of the present invention in a place needing many guiders and public information agents, like tourist destination, airport, exhibition, sports event area or the like, and unlike the simple kiosk display device, it permits users or visitors to get service with a new interest and a pleasure.

Further, by installing the learner aid device at the front or store in the general shop for the advertisement or propaganda without paying a cost for the advertisement, and allowing the character toy to show a variety of actions and facial expressions, it is possible to obtain a special effect for the article guidance, propaganda, attraction of customers, or the like.

Although the preferred embodiment of the present invention has been disclosed for illustrative purposes, those skilled in the art will appreciate that various F modifications, additions and substitutions can be made without departing from the scope and spirit of the invention as disclosed in the accompanying claims.

What is claimed is:

1. A computer interactive learning system comprising:
   a learner client having a learner aid device coupled to the learner client and a learning agent installed therein, the learner aid device including a display unit for displaying learning information, a distribution unit coupled to the display unit and having a hub function and a switching function, and an interactive toy coupled to the distribution unit; and
   a learning server connected with the learner client through Internet;
   wherein the learner aid device comprises:
   a housing having a receiving space formed therein and an entrance formed at the front thereof;
   a slide board recessed into or protruded from the housing; and
   a rotatable supporting stage rotatably installed on the slide board, for supporting the toy.

2. A computer interactive learning system comprising:
   a learner client having a learner aid device coupled to the learner client and a learning agent installed therein, the learner aid device including a display unit for displaying learning information, a distribution unit coupled to the display unit and having a hub function and a switching function, and an interactive toy coupled to the distribution unit; and
   a learning server connected with the learner client through Internet;
   wherein the learner aid device comprises:
   a housing having a receiving space formed therein and an entrance formed at the front thereof;
   a rotatable supporting stage rotatably installed on a slide board for supporting the toy; and
   a door for opening and closing the entrance.

* * * * *